(12) United States Patent
Navarro et al.

(10) Patent No.: US 8,650,145 B2
(45) Date of Patent: Feb. 11, 2014

(54) CREATING SNAPSHOTS OF DATA USING A SELECTED ONE OF DIFFERENT SNAPSHOT ALGORITHMS

(75) Inventors: Guillermo Navarro, Boise, ID (US); David K. Umberger, Boise, ID (US)

(73) Assignee: Hewlett-Packard Development Company, L.P., Houston, TX (US)

(\*) Notice: Subject to any disclaimer, the term of this patent is extended or adjusted under 35 U.S.C. 154(b) by 398 days.

(21) Appl. No.: 13/121,713

(22) PCT Filed: Oct. 7, 2008

(86) PCT No.: PCT/US2008/079039
§ 371 (c)(1),
(2), (4) Date: Mar. 30, 2011

(87) PCT Pub. No.: WO2010/042109
PCT Pub. Date: Apr. 15, 2010

(65) Prior Publication Data
US 2011/0178972 A1 Jul. 21, 2011

(51) Int. Cl.
*G06F 17/00* (2006.01)
*G06N 5/02* (2006.01)

(52) U.S. Cl.
USPC .......................................................... 706/47

(58) Field of Classification Search
None
See application file for complete search history.

(56) References Cited

U.S. PATENT DOCUMENTS

| | | | |
|---|---|---|---|
| 6,618,794 B1 | 9/2003 | Sicola et al. | |
| 6,898,667 B2 * | 5/2005 | Umberger et al. | 711/114 |
| 6,917,963 B1 * | 7/2005 | Hipp et al. | 709/204 |
| 6,957,433 B2 * | 10/2005 | Umberger et al. | 718/103 |
| 7,146,467 B2 * | 12/2006 | Bearden et al. | 711/137 |
| 7,213,165 B2 * | 5/2007 | Umberger et al. | 714/6.32 |
| 7,337,269 B2 * | 2/2008 | Umberger et al. | 711/112 |
| 8,201,018 B2 * | 6/2012 | Navarro et al. | 714/6.22 |
| 2004/0139125 A1 | 7/2004 | Stranssburg et al. | |

OTHER PUBLICATIONS

Search Report, PCT/US2008/079039, Apr. 30, 2009, 11 pages.
R.Y. Hou, J. Menon, Y.N. Patt, "Balancing I/O response time and disk rebuild time in a RAID5 disk array", Proc. Hawaii Int'l Conf. on System Science, Jan. 1993 (10 pages).
Buzen, J.P., Abstract: "Analysis of system bottlenecks using a queueing network model", ACM, 1971 (1 page).
J. Menon, A. Thomasian, "Performance Analysis of RAID5 Disk Arrays with a Vacationing Server Model for Rebuild Mode Operation", IEEE, 1994 (9 pages).
J. Menon, D. Mattson, "Distributed Sparing in Disk Arrays", IEEE, 1992 (12 pages).
A. Thomasian, "Rebuild Options in RAID5 Disk Arrays", IEEE,1995 (8 pages).
H. H. Kari, H. Saikkonen, S. Kim, F. Lombardi, "Repair Algorithms for Mirrored Disk Systems", IEEE, 1995 (9 pages).
L. Tadj, G. Choudhury, "Optimal Design and Control of Queues", TOP, vol. 13, Dec. 2005 (54 pages).
Heyman D.P., "Optimal operating policies for M/G/1 queueing systems", Operations Research, 1968 (23 pages).
Zhang Z.G., Vickson R., Love E., "Optimal service policies in an M/G/1 queueing system with multiple vacation types", 2001 (11 pages).

(Continued)

*Primary Examiner* — Michael B Holmes

(57) ABSTRACT

In a storage system, snapshots of data are created according to a snapshot algorithm in response to writes. The snapshot algorithm is selected from among a plurality of different snapshot algorithms according to one or more criteria.

13 Claims, 5 Drawing Sheets

(56) References Cited

OTHER PUBLICATIONS

Y. A. Phillips, R. Zhang, "Fuzzy Service Control of Queuing Systems", IEEE Transactions on Systems, Man and Cybernetics, vol. 29, No. 4, Aug. 1999 (15 pages).

R. Zhang et al., "Fuzzy Control of Queuing Systems", Int. J. Robust Nonlinear Control 2007 (2 pages).

Muntz et al., Performance Analysis of Disk Arrays Under Failure, Proceedings of the 16th VLDB Conference, Brisbane, Australia 1990 (12 pages).

Thomasian et al., RAID5 Performance with Distributed Sparing, IEEE Transactions on Parallel and Distributed Systems, vol. 8, No. 6, Jun. 1997 (18 pages).

Menon et al., Comparison of Sparing Alternatives for Disk Arrays, 1992 (12 pages).

Eitan Altman et al., Optimal Control of the M/G/1 Queue with Repeated Vacations of the Server, 1992 (19 pages).

Jau-Chuan KE, The Optimal Control in Batch Arrival Queue with Server Vacations, Startup and Breakdowns, 2004 (15 pages).

Zhang et al., Fuzzy Control of Arrivals to Tandem Queues with Two Stations, IEEE 1999 (7 pages).

* cited by examiner

CREATING SNAPSHOTS OF DATA USING A SELECTED ONE OF DIFFERENT SNAPSHOT ALGORITHMS

CROSS-REFERENCE TO RELATED APPLICATION

This application is a national stage application under 35 U.S.C. §371 of PCT/US2008/079039, filed Oct. 7, 2008.

BACKGROUND

A storage system, such as a storage array system or a storage area network of storage devices, can be used to store a relatively large amount of data on behalf of an enterprise (e.g., company, business, government agency, etc.). Data and software associated with users and applications can be stored in such a storage system, such that reduced local storage resources can be provided at user terminals.

Protection of data stored in a storage system is desirable. One aspect of data protection is to enable recovery of data in case of faults or corruption due to hardware and/or software failures, or data corruption or loss caused by malware attacks (e.g., attacks caused by a virus or other malicious code designed to cause damage to stored data).

One type of technique that has been used to protect data stored in a storage system is to create point-in-time copies of data as such data is modified by write operations. Point-in-time copies of data are also referred to as "snapshots." A snapshot can be created when a write occurs. In a snapshot-based storage system, original data can be kept in a source volume of data. Prior to modification of data in the source volume, a snapshot of the data to be modified can be taken. Many snapshots can be taken over time as writes are received at the storage system. If recovery of data is desired for any reason, one or more of the snapshots can be used to recover data back to a prior state, such as before a point in time when corruption or data loss occurred.

There are different algorithms for performing snapshots of data. A first type of snapshot algorithm is referred to as a "copy-on-write" (CoW) snapshot algorithm, in which a write of data causes the storage system to copy the original data from the source volume to a snapshot volume before proceeding with the write. With the copy-on-write snapshot algorithm, the original version of the data is kept in the snapshot volume, whereas the modified version of the data is kept in the source volume.

A second type of snapshot algorithm is a "redirect-on-write" (RoW) snapshot algorithm, in which the write data is redirected to another location ("redirect-on-write location") that is set aside for a snapshot, while the source volume maintains an original version of the data. The redirect-on-write snapshot algorithm effectively defers the taking of a snapshot until a later point in time—at a later point in time, snapshots of original versions of data present in the source volume are taken, with the modified versions of the data moved to the source volume from the redirect-on-write location.

Typically, a storage system uses just one type of snapshot algorithm (e.g., copy-on-write snapshot algorithm or redirect-on-write operation) to create snapshots in response to writes to data in a storage system. Under certain conditions, use of just a single snapshot algorithm in creating snapshots can result in reduced performance of a storage system. For example, with the copy-on-write snapshot algorithm, a copy penalty is associated with each data write, since the original version copy of the data has to be first copied to the snapshot volume before the data in the source volume is modified. On the other hand, although the redirect-on-write snapshot algorithm avoids the copy penalty immediately after a write occurs, tracking of data and data reconciliation can be more complex.

BRIEF DESCRIPTION OF THE DRAWINGS

Some embodiments of the invention are described, by way of example, with respect to the following figures.

DETAILED DESCRIPTION

In general, according to some embodiments, a flexible snapshot mechanism is provided for a storage system that stores data on one or more storage devices. The storage system can be a storage array of storage devices. Alternatively, the storage system can include a storage area network of storage devices. The flexible snapshot mechanism enables different types of snapshot algorithms to be used at different times, depending upon one or more criteria.

In the ensuing discussion, reference is made to data stored in "storage volumes," which refer to logical partitions of data contained in the storage system. A "volume" can refer to any collection of data in the storage system. A "source volume" is a volume that contains a version of data prior to modification of the data. A "snapshot volume" refers to a volume that contains point-in-time copies of data, which correspond to versions of data prior to modification of the data. Multiple snapshot volumes can be maintained in the storage system, where the multiple snapshot volumes are taken at different points in time.

Snapshot volumes are typically not accessed during normal operation of the storage system; however, in case of data failure or corruption, the snapshot volumes are accessed to recover data to a prior version.

As noted above, in accordance with some embodiments, different snapshot algorithms can be selectively used in the storage system at different times, depending upon one or more criteria. The multiple different snapshot algorithms can include a copy-on-write snapshot algorithm and a redirect-on-write snapshot algorithm, for example. It is noted that the storage system may also use other snapshot algorithms in other embodiments. The ability to select different snapshot algorithms to use according to one or more criteria can result in improved performance of the storage system, since it may be possible to improve response time by switching to a different snapshot algorithm depending upon the condition of the storage system.

Figure 1:
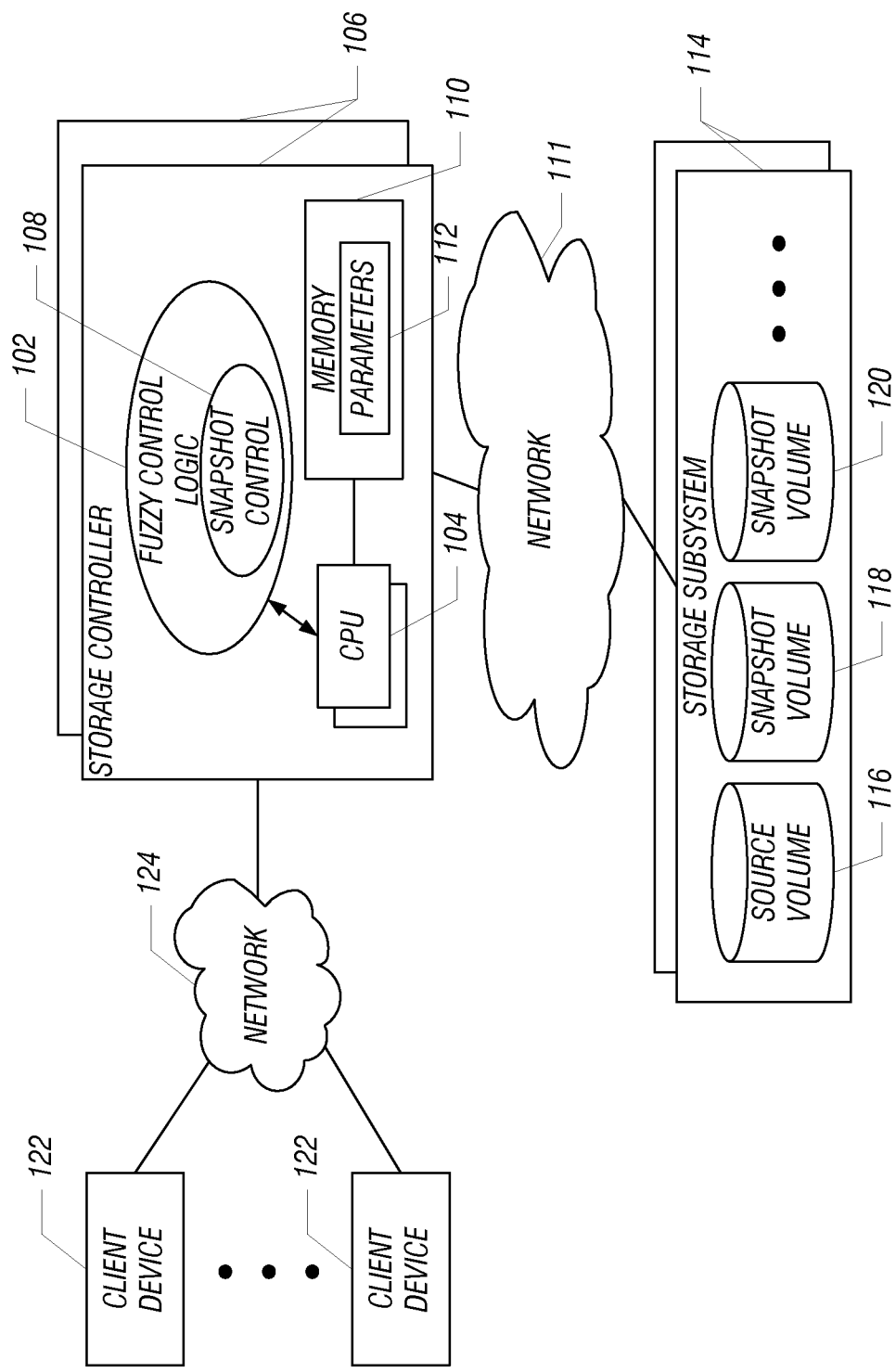
FIG. 1 is a block diagram of an exemplary storage system in which some embodiments of the invention can be incorporated.

As depicted in FIG. 1, the ability to switch between different snapshot algorithms is controlled by fuzzy control logic 102, which can be implemented in software and executable on one or more central processing units (CPUs) 104 of a storage controller 106. The fuzzy control logic 102 also includes snapshot control logic 108 that controls the creation of snapshots based on which snapshot algorithm has been selected by the fuzzy control logic 102.

FIG. 1 depicts the presence of multiple storage controllers 106. In a different implementation, just one storage controller can be used.

The CPU(s) 104 is (are) connected to a memory 110 in the storage controller 106. The memory 110 can be used to store one or more parameters 112 that define the one or more criteria that the fuzzy control logic 102 uses for selecting between different snapshot algorithms.

The storage controllers 106 are connected over a network 111 to storage subsystems 114. In one example, each storage subsystem 114 can be implemented with an array of storage devices. As depicted in FIG. 1, a storage subsystem 114 can include a source volume 116 of data and one or more snapshot volumes 118, 120 of data. The source volume 116 of data is used by the storage controller 106 during normal operation (reads and writes) of the storage system. However, if it is desirable to recover data, then one or more of the snapshot volumes 118, 120 can be used for recovering data back to a prior state at a particular point in time.

Although just one source volume 116 is depicted in the storage subsystem 114 of FIG. 1, it is noted that a storage subsystem 114 can include multiple source volumes and associated snapshot volumes.

The combination of the storage controllers 106 and storage subsystems 114 is referred to as a "storage system." The storage system is accessible by one or more client devices 122 that are connected over a network 124. The client devices 122 are able to submit read and write requests to the storage controllers 106. A read causes a storage controller 106 to retrieve the requested data from a storage subsystem 114 (or plural storage subsystems 114), while a write causes data to be written to the storage subsystem(s) 114 to modify data (or to add data). More generally, a write is considered to "update" data in the storage subsystem, where updating includes modifying existing data or adding new data.

Figure 2:
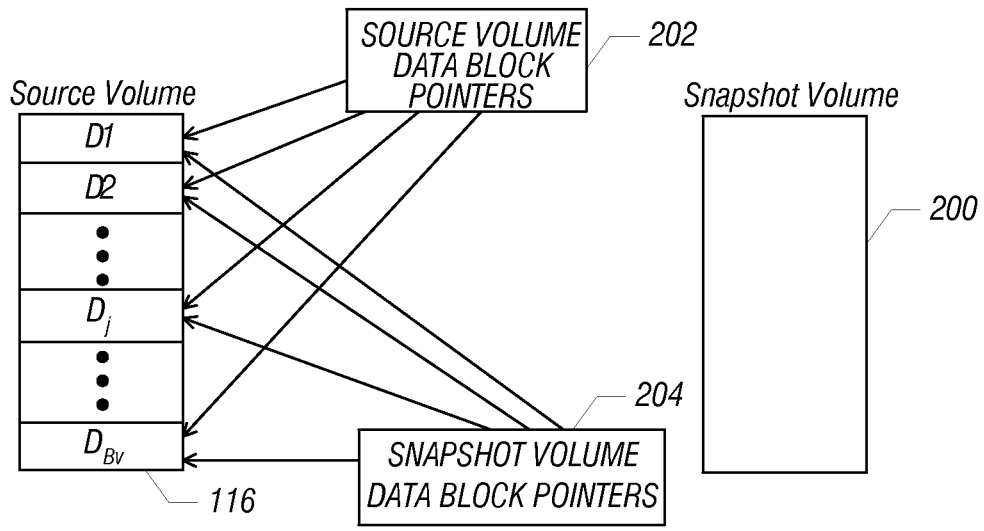
FIGS. 2-4 illustrate an exemplary copy-on-write snapshot algorithm that can be selectively used in the storage system, according to an embodiment.

With a copy-on-write snapshot algorithm, every write to the source volume causes the storage system to copy the original data from the source volume before proceeding with the write. Assume there is a source volume 116 including $D_i$ data blocks, as depicted in FIG. 2, where i=1 ... $B_v$, and where $B_v$ is the total number of data blocks that make up the source volume. FIG. 2 also shows a snapshot volume 200 right after creation, before it is populated with data. Right after the snapshot is created, the pointers (source volume data block pointers 202 and snapshot volume block pointers 204) to the data blocks for each of the source and snapshot volumes point to the original volume 116 only (these pointers to data blocks are also referred to as metadata). The copy-on-write algorithm is relatively space efficient, since it does not allocate any extra storage space unless a block of data in the source volume is modified. Generally, the source volume data block pointers 202 point to locations in the source volume 116 that contain the current state of the data. The snapshot volume data block pointers 204 point to locations in the source volume 116 and/or snapshot volume 200 that contain a prior version of data (before any modification of the data due to write operations).

Figure 3:
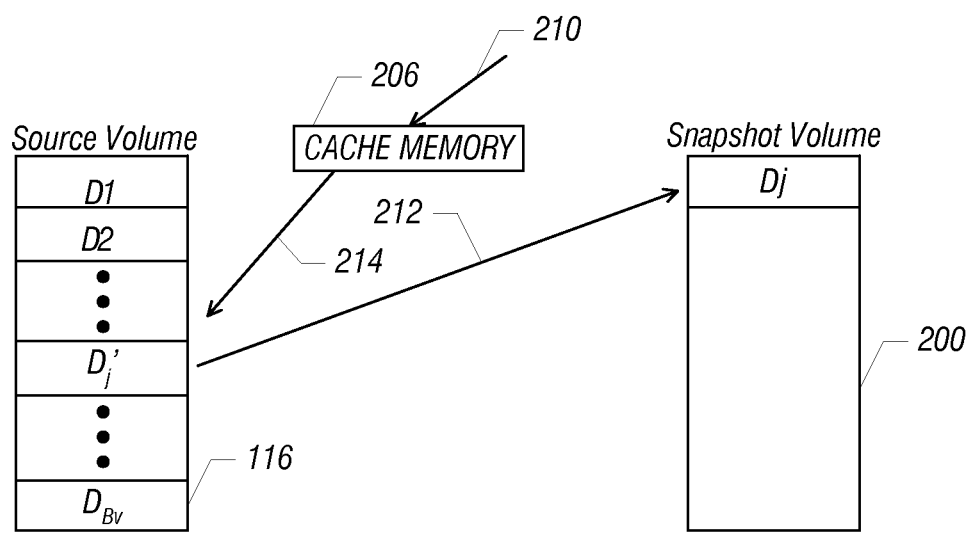

If a read request accesses a block of data that has not been written to since the creation of the snapshot volume 200, the data wilt be read from the source volume 116. If a write request occurs (at 210 in FIG. 3) to one of the data blocks (e.g., $D_j$) in the source volume 116, the storage system checks if this is the first update to this block after the snapshot volume was created. If this is the first update to the $D_j$ block, then this block of data is copied (at 212) to the snapshot volume 200 so that the point-in-time data is preserved. Note that the write request is held in a cache memory 206 (FIG. 3) of a storage controller 106 until the copy to the snapshot volume 200 has completed. Once the original $D_j$ block has been copied to the snapshot volume 200, the write can proceed (at 214) to the source volume 116. The original $D_j$ block in the source volume 116 has changed due to the write so it is now referred to as $D'_j$ in FIG. 3.

Figure 4:
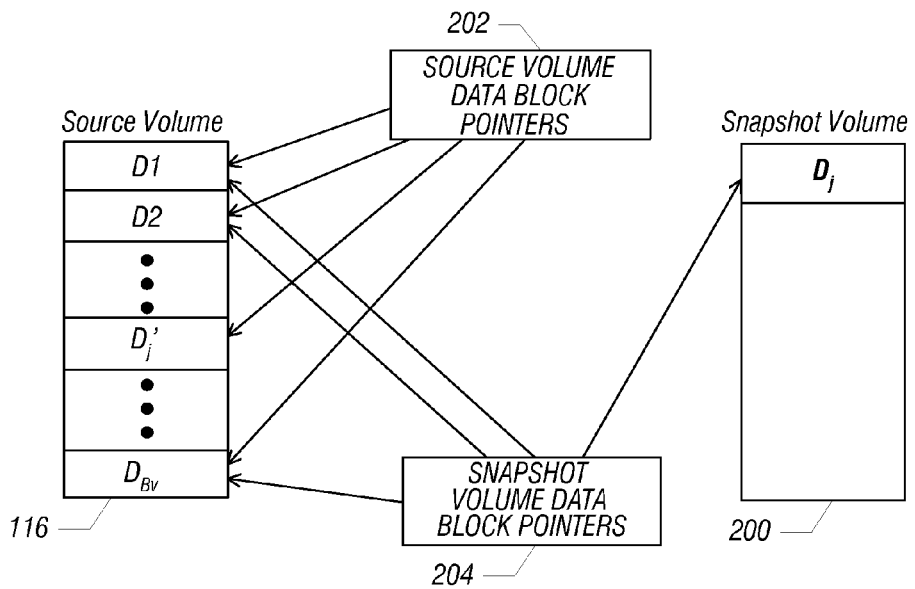

After the copy-on-write is performed, the pointers to the respective data blocks are updated (as shown in FIG. 4). Now the snapshot volume contains the original $D_j$ block. The source volume data block pointers 202 continue to point to the source volume 116. However, the snapshot volume data block pointers 204 are updated to point to the original $D_j$ block in the snapshot volume—the snapshot volume data block pointers 204 continue to point to un-modified data blocks in the source volume 116. A read request to the source volume will read the new $D'_j$ data block in the source volume 116 instead of the original $D_j$ block in the snapshot volume.

With the redirect-on-write snapshot algorithm, new writes to the source volume are redirected to another location ("redirect-on-write location") set aside for the snapshot volume. This avoids the copy-on-write penalty since the write proceeds without first copying the original data to the snapshot volume. But in this case, the original source volume would still contain the original (unmodified) data, and the snapshot volume has the updated block, which is the reverse of the copy-on-write scenario. If a snapshot volume is deleted, the data from the snapshot volume is reconciled back into the source volume.

Basically, with the redirect-on-write snapshot algorithm, the creation of a snapshot volume containing a prior version of modified data is deferred until a later point in time, such as when reconciliation has to be performed. It is noted that, with the redirect-on-write snapshot algorithm, as the same data block is modified multiple times, the tracking of the data of the modified data block for provision in additional snapshot volumes has to be tracked, which can be more complicated than would be the case for the copy-on-write scenario.

Thus, it is apparent from the foregoing that each of the copy-on-write and redirect-on-write algorithms has its benefits and downsides. The ability to selectively and dynamically switch between the different types of algorithms according to some embodiments allows the storage system to take advantage of the different benefits offered by the different types of snapshot algorithms to adapt to changing conditions of the storage system, such that overall performance of the storage system can be improved.

Figure 5:
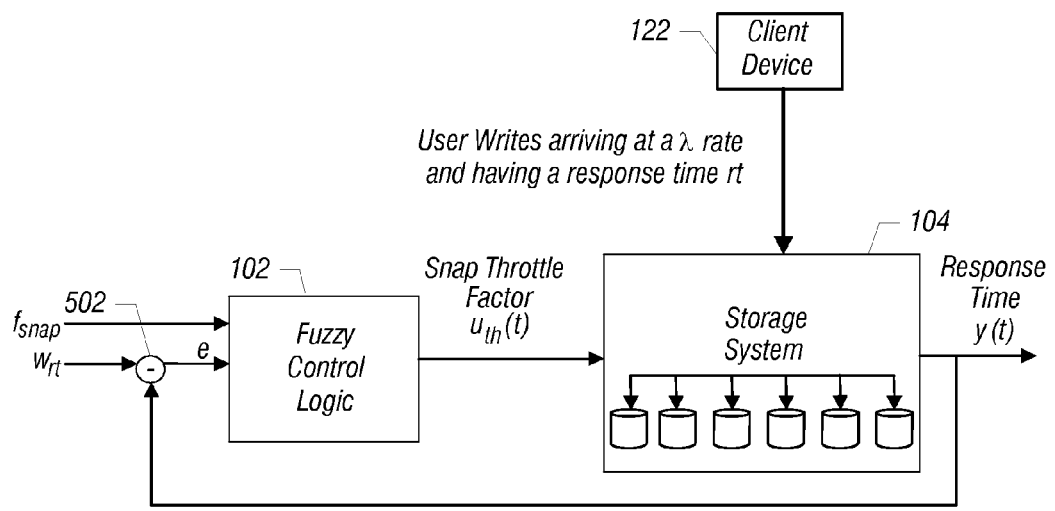
FIG. 5 is a block diagram of a portion of the storage system that includes a fuzzy control logic according to an embodiment.

FIG. 5 illustrates the fuzzy control logic 102 controlling selection among different snapshot algorithms. In some embodiments, the selection among different snapshot algorithms is based on a snap throttle factor, $u_{th}(t)$, which represents a percentage of the time the copy-on-write snapshot algorithm is to be used (out of all the available snapshot algorithms). For example, if just the copy-on-write snapshot algorithm and redirect-on-write snapshot algorithm are considered, then the snap throttle factor, $u_{th}(t)$, of c percentage means that the copy-on-write snapshot algorithm will be used c percentage of the time, whereas the redirect-on-write snapshot algorithm would be used (1−c) percentage of the time.

The snap throttle factor, $u_{th}(t)$, is an input to the snapshot control logic 108 of FIG. 1. Based on the snap throttle factor, $u_{th}(t)$, the snapshot control logic 108 determines which of the snapshot algorithms to use at any given lime.

The term "snap" referred to above is used synonymously with copy-on-write. Thus, the "snap" throttle factor means the factor indicating the percentage of time that copy-on-write is to be used.

FIG. 5 shows feedback provided by the storage subsystem 104 to the fuzzy control logic 102. The feedback provided is in the form of response time, y(t), of the storage system. The response time of the storage system refers to the amount of time (e.g., instantaneous response time, average response time, median response time, etc.) that the storage system takes to respond to a read/write request. As noted above, use of the copy-on-write snapshot algorithm is associated with some amount of latency in that the write has to wait until the original version of the block of data (that is to be modified) has been copied to the snapshot volume before the write to the source volume can complete. As a result, in view of this latency associated with copy-on-write, the response time, y(t), is monitored by the fuzzy control logic 102 in rendering its decision regarding the snap throttle factor, $u_{th}(t)$.

In some embodiments, two input parameters (criteria) that are provided to the fuzzy control logic 102 are: (1) the fraction of snapped blocks in the source volume, $f_{snap}$ (which refers to the fraction of blocks in the source volume that have been copied to a snapshot volume as a result of a write to those blocks), and (2) the reference response time, $w_{rt}$, which represents the maximum acceptable response time during a snapshot process. As depicted in FIG. 5, the feedback response time, y(t), is compared by a comparator 502, to the reference response time, $w_{rt}$. In some implementations, the comparison is in the form of a subtraction: $y(t)-w_{rt}$.

According to the input parameters, the fuzzy control logic 102 regulates or "throttles" the rate of copy-on-writes in a dynamic and intelligent manner to reduce system response time. In some embodiments, the fuzzy control logic 102 attempts to minimize the system response time when regulating or throttling the rate of copy-on-writes, based on the snap throttle factor, $u_{th}(t)$.

By using different snapshot algorithms at different times, such as the copy-on-write snapshot algorithm and the redirect-on-write snapshot algorithm, it is noted that reconciliation between the state of the data when redirect-on-write snapshot is used versus when copy-on-write snapshot is used has to be performed. To provide such reconciliation, a tracking mechanism is provided to track data blocks for which redirect-on-write has been performed. The tracking mechanism includes a redirect-on-write pointer that points to the data block associated with a redirect-on-write. Note that redirect-on-write causes a write to occur to the snapshot volume rather than the source volume; as a result, the redirect-on-write pointer will point to modified data in the snapshot volume. An example is depicted in FIG. 6, which shows a redirect-on-write (RoW) pointer 602, in addition to the source volume data block pointers 202 and snapshot volume data block pointers 204 discussed above in connection with FIGS. 2-4.

Figure 6:
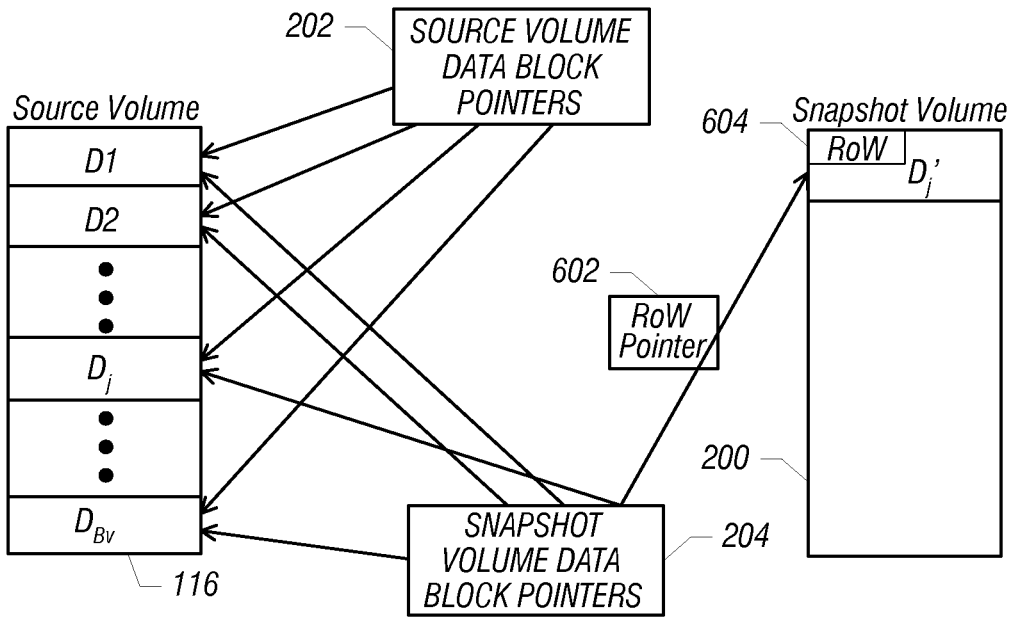
FIGS. 6-7 illustrate switching between a redirect-on-write algorithm and a copy-on-write algorithm, according to an embodiment.

In the example of FIG. 6, the fuzzy control logic 102 (FIG. 1) had decided to perform a redirect-on-write (instead of a copy-on-write) on data block $D_j$; as a result, the RoW pointer 602 is added to keep track of the RoW modified data and its location 604 in the snapshot volume 200. To simplify the use of RoW pointers, the following RoW-CoW rule is established: only one RoW pointer will be allowed per given data block in the snapshot volume 200; if another write occurs in the given data block in the source volume, then a copy-on-write will be performed regardless of the fuzzy throttle factor $u_{th}(t)$.

Figure 7:
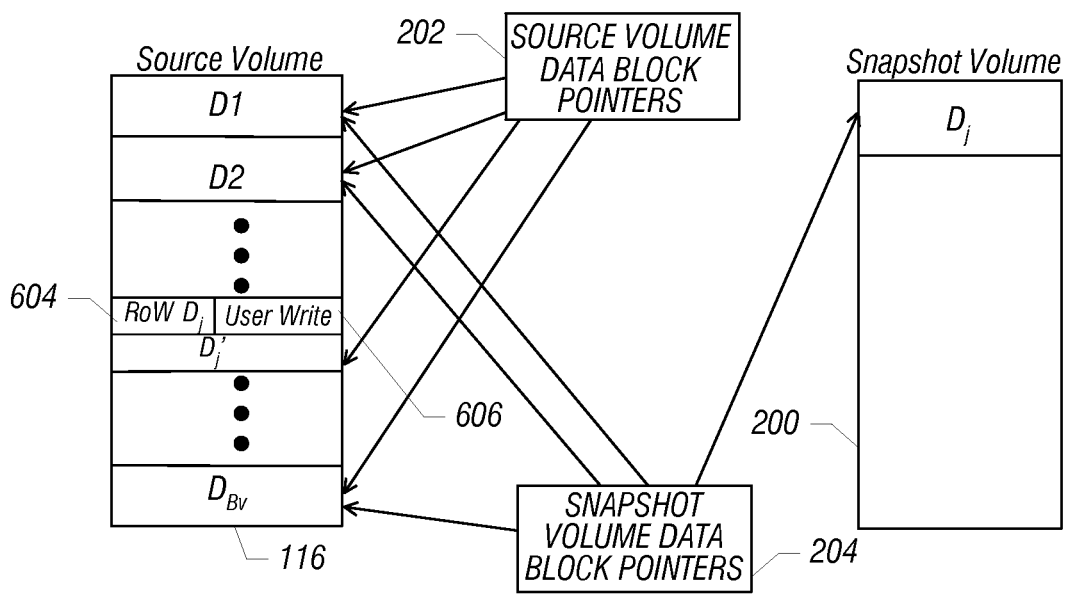

An example of the above rule is discussed in the context of FIG. 7, which is a continuation of the example of FIG. 6. Another write has occurred to data block $D_j$ in the source volume 116 (resulting in modified data 606 in FIG. 7). For this write, the fuzzy control logic 102 applies the RoW-CoW rule and performs a copy-on-write of the data block $D_j$ regardless of the input parameters to the fuzzy control logic 102. Thus, as depicted in FIG. 7, the RoW modified data 604 is moved to the data block in the source volume 116. Thus, the data block $D_j$ in the source volume 116 has both the RoW modified data 604 and the subsequent write data 606. On the other hand, the snapshot volume 200 now has the original version of the data block $D_j$ prior to the RoW write and the subsequent write.

Thus, according to the RoW-CoW rule, RoW pointers are used only when a redirect-on-write occurs for first writes to respective data blocks. Each subsequent write to such data blocks will cause the RoW-CoW rule to apply, which will result in a copy-on-write being performed, and the RoW pointer being deleted since the snapshot volume data block pointers 204 will point to the snapped data block as is done for copy-on-writes.

Returning again to FIG. 5, client devices 122 issue write requests to the storage system, with the write requests arriving at a rate λ, and having a response time rt.

To control the response time y(t) output by the storage system, the output y(t) is periodically monitored every $T_m$ time interval. The decision of how often to monitor is based on the maximum acceptable response $w_{rt}$ (e.g., $T_m$ can be set equal to $w_{rt}$). However, a lower monitoring time interval ($T_m < w_{rt}$) can also provide a fast control response from the fuzzy control logic 102 without interrupting the storage controller as much. Effectively, the sampling of the output y(t) is performed at intervals of time $T_m$. Each sample is denoted by $y(t_i)$, where i is the i-th sample of the output that occurred at a time $t_i$, as follows:

$$t_i = T_m * i \text{ where } i=0, 1, 2, \ldots \quad (Eq. 1)$$

The output $y(t_i)$ is compared with the reference response time $w_{rt}$ to compute the error with respect to it:

$$e(t_i) = y(t_i) - w_{rt}. \quad (Eq. 2)$$

The change in error is also computed:

$$\Delta e(t_i) = e(t_i) - e(t_{i-1}). \quad (Eq. 3)$$

The fuzzy control logic 102 can be considered as a proportional and integral (PI) control logic because of the use of the error e and the change in error Δe.

The next step is the calculation of the probability of a snap at a certain time. To do that, the fraction of snap at time $t_i$ is $f_{snap}(t_i)$ is defined. The $f_{snap}(t_i)$, in addition to being an indication of the percentage of blocks snapped, also denotes the probability of further snaps. For example, if 90% of the blocks in a source volume have been snapped, the probability of causing further snaps is only 10% (assuming a random user access over the volume). This is a consequence of the binomial nature of the snapshot process. The probability of a snap at time $t_i$ is:

$$p_{snap}(t_i) = 1 - f_{snap}(t_i). \quad (Eq. 4)$$

The probability of a snap $p_{snap}(t_i)$, the error $e(t_i)$, and the change in error $\Delta e(t_i)$, are the three variables used by the fuzzy control logic 102 to compute the snap throttle factor, $u_{th}(t_i)$. To be used in the fuzzy control logic 102 and combined according to fuzzy rules, these three variables are first "fuzzified." The fuzzification of $p_{snap}$ is done in a straightforward fashion. If the probability of a snap is below or equal to 0.5 (or some other predefined fraction), it is mapped to a Low Probability (LP) fuzzy descriptor. If the probability of a snap is greater than 0.5 (or some other predefined fraction), it is mapped to a High Probability (HP) fuzzy descriptor. The membership function of probability of a snap is therefore defined by:

$$\mu_{psnap}(p_{snap}) = \begin{cases} 0 & \text{if } p_{snap} \leq 0.5 \\ 1 & \text{if } p_{snap} > 0.5. \end{cases} \quad \text{(Eq. 5)}$$

The final fuzzification of the $p_{snap}$ value is denoted by $F_{\mu snap}(\mu_{snap})$, and is defined as:

$$F_{psnap}(\mu_{snap}) = \begin{cases} LP & \text{if } \mu_{snap} = 0 \\ HP & \text{if } \mu_{snap} = 1 \end{cases} \quad \text{(Eq. 6)}$$

A goal in the fuzzification of the error e and change in error Δe is to map them in one of three fuzzy descriptors: Zero (ZE), Positive Error (PE), and Negative Error (NE), respectively. These fuzzy descriptors apply to both the error e and change in error Δe These fuzzy descriptors indicate when the error is close to zero, or in case where the error does exist, whether the error is positive or negative. Positive error occurs if the response time y(t) is greater than the reference response time $w_{rt}$ (which means that copy-on-writes are causing the monitored response time to exceed the maximum acceptable response time, which indicates that copy-on-writes should not be performed—instead, redirect-on-writes should be performed). Negative error occurs if the response time y(t) is less than the reference response time $w_{rt}$ (which means that the monitored response time is within the maximum acceptable response time, which indicates that the number of copy-on-writes can be increased).

The fuzzification is first performed via three triangular membership functions $\mu^{ZE}$, $\mu^{NE}$, and $\mu^{PE}$, based on the reference response time $w_{rt}$. The three mathematical membership functions are:

$$\mu_e^{ZE}(e, w_{rt}) = \begin{cases} 1 - \frac{2e}{w_{rt}} & \text{if } e > 0 \\ 1 & \text{if } e = 0 \\ 1 + \frac{2e}{w_{rt}} & \text{if } e < 0. \end{cases} \quad \text{(Eq. 7)}$$

$$\mu_e^{PE}(e, w_{rt}) = \begin{cases} 1 & \text{if } e \geq w_{rt} \\ \frac{4e}{3w_{rt}} - \frac{1}{3} & \text{if } e \text{ in } \left(\frac{1}{4}w_{rt}, w_{rt}\right) \\ 0 & \text{if } e \leq \frac{1}{4}w_{rt}. \end{cases} \quad \text{(Eq. 8)}$$

$$\mu_e^{NE}(e, w_{rt}) = \begin{cases} 0 & \text{if } e \geq -\frac{1}{4}w_{rt} \\ -\frac{4e}{3w_{rt}} - \frac{1}{3} & \text{if } e \text{ in } \left(-\frac{1}{4}w_{rt}, -w_{rt}\right) \\ 1 & \text{if } e \leq -w_{rt}. \end{cases} \quad \text{(Eq. 9)}$$

The membership functions of Eqs. 7-9 are for the error e but these same membership functions are used for the change in error Δe by using Δe as the independent variable instead of the error e.

Finally, the error e and the change in error Δe are mapped into one of the fuzzy descriptors (NE, ZE, or PE). This is accomplished by comparing the values obtained for the three membership functions (Esq. 7-9). Depending on which of the three has the maximum value, the fuzzy value of the error $F_e$, and the fuzzy value of the change in error $F_{\Delta e}$, are mapped into one of the fuzzy descriptors NE, ZE, PE, Mathematically:

$$F_e = \max(\mu_e^{NE}, \mu_e^{ZE}, \mu_e^{PE}), \text{ and} \quad \text{(Eq. 10)}$$

$$F_{\Delta G} = \max(\mu_{\Delta e}^{NE}, \mu_{\Delta e}^{ZE}, \mu_{\Delta e}^{PE}). \quad \text{(Eq. 11)}$$

The error e is mapped to one of NE, ZE, and PE depending upon which of $\mu_e^{NE}$, $\mu_e^{ZE}$, $\mu_e^{PE}$, respectively, has the largest value; similarly, the change in error Δe is mapped to one of NE, ZE, and PE depending upon which of $\mu_{\Delta e}^{NE}$, $\mu_{\Delta e}^{ZE}$, $\mu_{\Delta E}^{PE}$, respectively, has the largest value.

For example, if the output y(1) is 45 ms (milliseconds), then using (Eq. 2) the error e is 15 ms. And using Eqs. 7-9, the membership values are $\mu_{ZE}=0$, $\mu^{NE}=0$, $\mu^{PE}=1$. It is clear that the maximum value corresponds to $\mu^{PE}$. Using Eq. 10, the fuzzy value of the error $F_e$ will be mapped to Positive Error, PE.

The rule base can be built now based on the following heuristic criteria: 1) if the response time is high, then error, e, is fuzzy positive, PE, and the fuzzy control logic 102 has to reduce the number of copy-on-writes occurring—the snap throttle factor $u_{th}$ is reduced; 2) if the response time is low, then the fuzzy control logic 102 can increase the number of copy-on-writes occurring—the snap throttle factor $u_{th}$ is increased.

An example rule base is provided below:

|  | Rule Input Variables | | | Rule Output |
| --- | --- | --- | --- | --- |
|  | $p_{snap}$ | e | Δe | $\Delta u_{th}$ |
| $R_1$ | HP | PE | PE | −0.2 |
| $R_2$ | HP | PE | NE | −0.1 |
| $R_3$ | HP | ZE | PE | −0.1 |
| $R_4$ | HP | ZE | PE | −0.1 |
| $R_5$ | HP | NE | ZE | +0.05 |
| $R_6$ | HP | NE | NE | +0.05 |
| $R_7$ | LP | PE | PE | −0.05 |
| $R_8$ | LP | PE | ZE | −0.05 |
| $R_9$ | LP | ZE | PE | −0.05 |
| $R_{10}$ | LP | NE | PE | +0.05 |
| $R_{11}$ | LP | NE | NE | +0.05 |

The rule base includes 11 rules $R_1$ to $R_{11}$, where each rule specifies an output value for $\Delta u_{th}$ based on values of $p_{snap}$ (HP or LP), e (PE, NE, or ZE), and Δe (PE, NE, or ZE).

In some embodiments, a lower bound (e.g., 0.05) is set for the snap throttle factor such that the snap throttle factor $u_{th}$ value is in the [0.05, 1] range and the fuzzy control logic 102 checks the value of $u_{th}$ after each execution of one of the rules to ensure that $u_{th}$ is within this range. The snap throttle factor $u_{th}=0.05$ means that at least 5% of the writes that cause a copy-on-write will be allowed to proceed. This lower bound on $u_{th}$ is set this way to allow some copy-on-writes to proceed and make progress, even if it is just little. The choice of the lower bound for $u_{th}$ can be based on empirical observations of actual snapshot processes.

Figure 8:
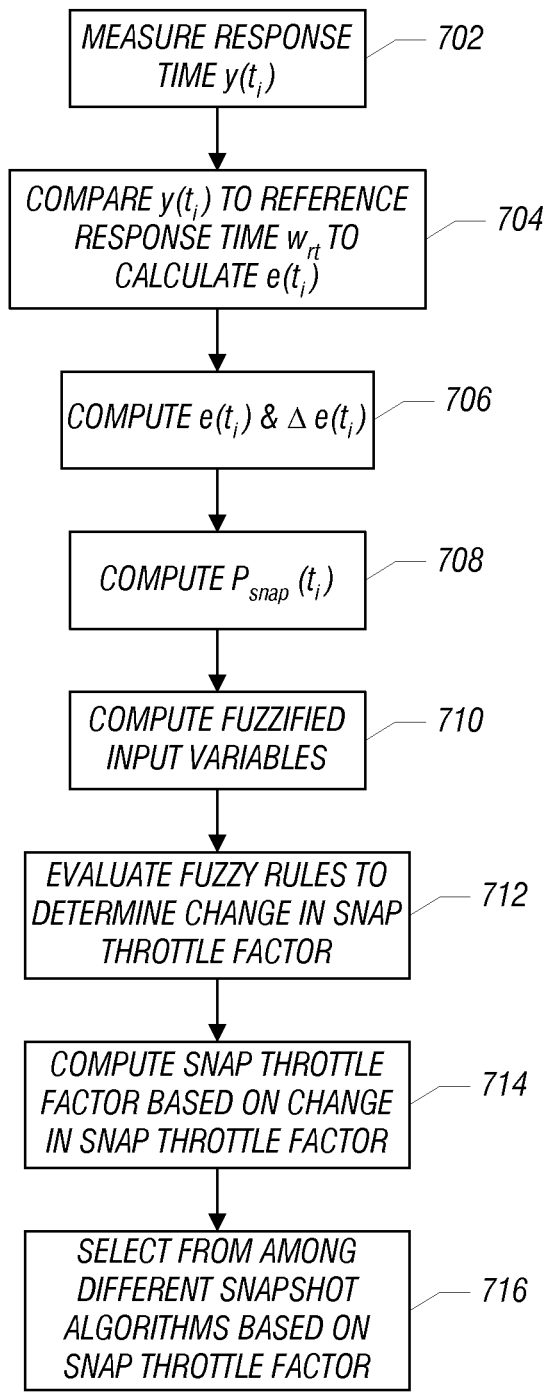
FIG. 8 is a flow diagram of a procedure for applying a flexible snapshot mechanism according to an embodiment.

FIG. 8 shows a procedure according to some embodiments. Every $T_m$ seconds, for every i-th iteration, at a time $t_i$ (Eq. 1), the response time $y(t_i)$ is measured (at 702) and compared (at 704) with the reference response time $w_{rt}$. The error $e(t_i)$ and the change in error $\Delta e(t_i)$ are computed (at 706) according to Eqs. 2-3. The probability of a snap $psnap(t_i)$ is computed (at 708) according to Eq. 4. The three input variables e, and Δe, and $p_{snap}$, are then fuzzified (at 710), such that $p_{snap}$ is mapped to value HP or LP, e is mapped to PE, NE, or ZE, and Δe is mapped to PE, NE, or ZE. The fuzzified input variables will make up the fuzzy rule base, such as the exemplary rule base provided above, of the fuzzy control logic 102. The fuzzy rule base is evaluated (at 712) as discussed above to obtain the change in snap throttle factor $\Delta u_{th}(t_i)$. The change $\Delta u_{th}(t_i)$ is used to compute (at 714) the final output of the fuzzy control logic, which is the throttle factor $u_{th}(t_i)$:

$$u_{th}(t_i) = u_{th}(t_{i-1}) + \Delta u_{th}(t_i). \qquad \text{(Eq. 12)}$$

According to the throttle factor, the fuzzy control logic 102 selects (at 716) one of the copy-on-write snapshot algorithm and redirect-on-write snapshot algorithm to use for a write request. Note that the fuzzy control logic 102 also takes into account the RoW-CoW rule discussed above when selecting between the snapshot algorithms.

The initial values of $u_{th}$ and e to be used by the fuzzy control logic 102 when a snapshot volume is first created are $u_{th}(0)=0.05$ and $e(0)=0$. The output of the fuzzy rules is the change in snap throttle factor $\Delta u_{th}(t_i)$ that will be used to obtain the new snap throttle factor $u_{th}(t_i)$ according to Eq. 12. The factor $u_{th}(t_i)$ will be used to decide what-percentage of the work requests are to be processed according to copy-on-write and what percentage are to be processed according to redirect-on-write. Table 1 shows an example of the complete rule base.

Using the flexible snapshot algorithm discussed above, response times of storage systems that use snapshot mechanisms to provide data protection can be improved.

Instructions of software described above (including the fuzzy control logic 102 and snapshot control logic 104 of FIG. 1) are loaded for execution on a processor (such as one or more CPUs 104 in FIG. 1). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use with a storage system, comprising:
 in response to writes, creating snapshots of data using a snapshot algorithm; and
 selecting the snapshot algorithm from among a plurality of different snapshot algorithms according to one or more criteria, wherein selecting the snapshot algorithm from among the plurality of snapshot algorithms according to the one or more criteria comprises selecting the snapshot algorithm from among the plurality of snapshot algorithms according to input variables including at least a first parameter indicating a fraction of a source volume that has been snapped and a second parameter indicating a maximum acceptable response time of the storage system.

2. The method of claim 1, wherein selecting the snapshot algorithm from among the plurality of different snapshot algorithms comprises selecting form among at least a copy-on-write algorithm and a redirect-on-write algorithm.

3. The method of claim 1, wherein selecting the snapshot algorithm from among the plurality of different snapshot algorithms comprises selecting from among at least a first algorithm that performs a snap at a time of a write, and a second algorithm that defers a snap in response to a write.

4. The method of claim 1, further comprising:
 monitoring a response time of the storage system; and
 comparing the monitored response time to the maximum acceptable response time to compute an error, wherein the error is used to select from among the plurality of snapshot algorithms.

5. The method of claim 4, further comprising:
 computing a probability of a snap based on the fraction, wherein the probability is used to select from among the plurality of snapshot algorithms.

6. The method of claim 5, further comprising:
 fuzzifying the probability of the snap by mapping different values of the probability to different first fuzzy values;
 fuzzifying the error by mapping different values of the error to different second fuzzy values,
 wherein the first and second fuzzy values are part of a rule base used to select from among the plurality of snapshot algorithms.

7. The method of claim 6, further comprising:
 computing a change in error based on values of the error computed at different times; and
 fuzzifying the change in error by mapping different values of the change in error to different third fuzzy values,
 wherein the third fuzzy values are also part of the rule base.

8. A storage system comprising:
 a processor to:
  receive a write request to modify data;
  select, based on a rule base, which of plural snapshot algorithms to use for creating snapshots;
  apply the selected snapshot algorithm in processing the write request; and
  reconcile data blocks modified using different ones of the plural snapshot algorithms.

9. The storage system of claim 8, wherein the reconciling is accomplished by tracking modified data processed using a first of the snapshot algorithms, and using the tracking to enable performing a second of the snapshot algorithms at a later point in time.

10. The storage system of claim 8, wherein the plural snapshot algorithms comprise a copy-on-write snapshot algorithm and a redirect-on-write snapshot algorithm.

11. An article comprising at least one computer-readable storage medium containing instructions that when executed cause a storage system to:
- receive a write request to modify data;
- select, based on a rule base, which of plural snapshot algorithms to use for creating snapshots; and
- apply the selected snapshot algorithm in processing the write request.

12. The article of claim 11, wherein the plural snapshot algorithms comprise a copy-on-write snapshot algorithm and a redirect-on-write snapshot algorithm.

13. The article of claim 11, wherein the instructions when executed cause the storage system to further reconcile data blocks modified using different ones of the plural snapshot algorithms, wherein the reconciling is accomplished by tracking modified data processed using a first of the snapshot algorithms, and using the tracking to enable performing a second of the snapshot algorithms at a later point in time.

* * * * *

UNITED STATES PATENT AND TRADEMARK OFFICE
CERTIFICATE OF CORRECTION

PATENT NO.       : 8,650,145 B2
APPLICATION NO.  : 13/121713
DATED            : February 11, 2014
INVENTOR(S)      : Navarro et al.

Page 1 of 1

It is certified that error appears in the above-identified patent and that said Letters Patent is hereby corrected as shown below:

In the Claims

Column 10, line 19, Claim 2, delete "form" and insert -- from --, therefor.

Signed and Sealed this
Tenth Day of June, 2014

Michelle K. Lee
*Deputy Director of the United States Patent and Trademark Office*